US012659169B2

(12) United States Patent
Yan et al.

(10) Patent No.: US 12,659,169 B2
(45) Date of Patent: Jun. 16, 2026

(54) USER DATA MANAGEMENT METHOD AND RELATED DEVICE

(71) Applicant: HUAWEI TECHNOLOGIES CO., LTD., Shenzhen (CN)

(72) Inventors: Xueqiang Yan, Shanghai (CN); Mingyu Zhao, Shanghai (CN); Jianjun Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 94 days.

(21) Appl. No.: 18/525,908

(22) Filed: Dec. 1, 2023

(65) Prior Publication Data

US 2024/0097917 A1     Mar. 21, 2024

Related U.S. Application Data

(63) Continuation of application No. PCT/CN2022/091117, filed on May 6, 2022.

(30) Foreign Application Priority Data

Jun. 4, 2021     (CN) .......................... 202110626638.6

(51) Int. Cl.
*H04L 9/32* (2006.01)
*H04L 9/00* (2022.01)

(52) U.S. Cl.
CPC .............. *H04L 9/3247* (2013.01); *H04L 9/50* (2022.05)

(58) Field of Classification Search
CPC ................................. H04L 9/3247; H04L 9/50

USPC .......................................................... 713/176
See application file for complete search history.

(56) References Cited

U.S. PATENT DOCUMENTS

| | | | | |
|---|---|---|---|---|
| 10,367,645 B2 * | 7/2019 | Dechu | ................... | H04L 9/3239 |
| 10,375,050 B2 * | 8/2019 | Lyons | ................... | H04L 9/3242 |
| 10,467,586 B2 * | 11/2019 | Fuller | ................... | H04L 9/3247 |
| 10,728,046 B1 * | 7/2020 | Yang | ..................... | H04L 9/3297 |

(Continued)

FOREIGN PATENT DOCUMENTS

| | | |
|---|---|---|
| CN | 107103252 A | 8/2017 |
| WO | 2017054985 A1 | 4/2017 |

OTHER PUBLICATIONS

Extended European Search Report for EP Application No. 22814959 dated Sep. 20, 2024, 8 pages.

(Continued)

*Primary Examiner* — Amare F Tabor

(57) ABSTRACT

The technology of this application relates to a user data management method and a related device, to improve user information security. The method in embodiments of this application includes a data request device sends a first request to a blockchain platform, where the first request indicates that the data request device needs to access a data storage device. The data request device receives first permission information sent by the blockchain platform, where the first permission information indicates whether the data request device has permission to access the data storage device. If the first permission information indicates that the data request device has the permission to access the data storage device, the data request device sends a second request to the data storage device, where the second request includes an access address.

20 Claims, 13 Drawing Sheets

(56) References Cited

U.S. PATENT DOCUMENTS

2020/0358801 A1    11/2020   Allouche et al.
2021/0006400 A1     1/2021   Hu et al.

OTHER PUBLICATIONS

International Search Report for Application No. PCT/CN2022/091117 dated May 6, 2022, 9 pages.

* cited by examiner

2G/3G/4G/IMS user data architecture 5G user data management architecture

USER DATA MANAGEMENT METHOD AND RELATED DEVICE

CROSS-REFERENCE TO RELATED APPLICATIONS

This application is a continuation of International Application No. PCT/CN2022/091117, filed on May 6, 2022, which claims priority to Chinese Patent Application No. 202110626638.6, filed on Jun. 4, 2021. The disclosures of the aforementioned applications are hereby incorporated by reference in their entireties.

TECHNICAL FIELD

Embodiments of this application relate to the field of data processing, and in particular, to a user data management method and a related device.

BACKGROUND

User data management is one of the most central functions of a mobile communication network. Provision of a user service and normal operating of the network need to depend on a user data management entity and a related procedure. The user data management entity of the mobile network stores user and service subscription related data, key information, and the like, and is the key to implementing user authentication, authorization, and access control.

In current 2G to 5G core network architectures, each user has much information, such as subscription information, key information, and service information. The user information is managed together in a centralized single-point user data management device. The user data management device is connected to another control panel network entity or an application server, to provide a data access service. For example, in a core network architecture of a 5G network, user information is managed by a unified data management (UDM). The UDM manages network user data in a single network element and may be paired with a user data repository. The user data repository stores user information. The UDM is located on a control plane.

Because the user information is managed by the centralized single-point user data management device, there is a single point failure and it is vulnerable to a distributed denial of service (DDoS) attack. As a result, there is a high data security risk.

SUMMARY

Embodiments of this application provide a user data management method and a related device, to improve user data security.

A first aspect of embodiments of this application provides a user data management method. The method is used by a user data management system to manage user data. The system includes a data request device, a data storage device, and a blockchain platform. When the data request device needs to access the data storage device, the user data management system performs a corresponding operation. Specifically, the method includes: The data request device sends a first request to the blockchain platform, where the first request indicates that the data request device needs to access the data storage device, and the first request includes signature information of the data request device and an access type. The data request device receives first permission information sent by the blockchain platform, where the first permission information indicates whether the data request device has permission to access the data storage device, and the permission is related to the signature information of the data request device and the access type. If the first permission information indicates that the data request device has the permission to access the data storage device, the data request device sends a second request to the data storage device, where the second request includes an access address. In other words, determining whether the data request device has the permission to access the data storage device is related to the signature information of the data request device and the access type.

In this possible implementation, before accessing the data storage device, the data request device needs to obtain that the blockchain platform confirms that the data request device has the corresponding permission. Because the blockchain platform has features such as decentralization and anti-tampering, the blockchain platform having authentication and authorization functions has no risk of a single-point failure, and relatively little data is lost when the blockchain platform is attacked by a distributed denial of service. As a result, the user data has higher security. In another aspect, the first request includes the access type, and access information is further refined, so that the blockchain platform can more accurately determine permission corresponding to the first request.

In a possible implementation of the first aspect, the access type includes data writing and data reading; and if the access type is the data writing, the first request further includes the access address; or if the access type is the data reading, the first permission information includes the access address.

In a possible implementation of the first aspect, after the data request device sends the second request to the data storage device, the method further includes: The data request device receives confirmation information sent by the data storage device, where the confirmation information indicates that the data storage device has executed a task corresponding to the second request.

In this possible implementation, the data request device can learn whether the data storage device has executed the task corresponding to the second request, so that a corresponding response can be performed accordingly, to increase information obtained by the data request device.

In a possible implementation of the first aspect, before the data request device sends the first request to the blockchain platform, the method further includes: The data request device receives a third request sent by user equipment, where the third request indicates the data request device to send the first request to the blockchain platform.

In a possible implementation of the first aspect, the signature information of the data request device includes signature information of the user equipment.

In a possible implementation of the first aspect, the access type includes data writing, data deletion, data reading, and data modification.

In a possible implementation of the first aspect, after the data request device receives the confirmation information sent by the data storage device, the method further includes: The data request device sends task result information to the user equipment, where the task result information indicates whether the data storage device has completed the task corresponding to the second request.

In this possible implementation, the user equipment can learn whether the data storage device has executed the task corresponding to the second request, so that a corresponding response can be performed accordingly, to increase information obtained by the user equipment.

A second aspect of embodiments of this application provides a user data management method. The method is used by a user data management system to manage user data. The system includes a data request device, a data storage device, and a blockchain platform. When the data request device needs to access the data storage device, the user data management system performs a corresponding operation. The method includes the data storage device receives a second request of the data request device, where the second request includes an access address. The data storage device sends an access verification request to the blockchain platform, where the access verification request indicates the data request device to send a second request to the data storage device. The data storage device receives second permission information sent by the blockchain platform, where the second permission information indicates whether the data storage device is capable of executing a task corresponding to the second request. If the second permission information indicates that the data storage device is capable of executing the task corresponding to the second request, the data storage device executes the corresponding task based on the second request.

In this possible implementation, before accessing the data storage device, the data request device needs to obtain that the blockchain platform confirms that the data request device has the corresponding permission. Because the blockchain platform has features such as decentralization and anti-tampering, the blockchain platform having authentication and authorization functions has no risk of a single-point failure, and relatively little data is lost when the blockchain platform is attacked by a network. As a result, the user data has higher security. In another aspect, the first request includes an access type, and access information is further refined, so that the blockchain platform can more accurately determine permission corresponding to the first request. In addition, because only related information of the user data is stored in the blockchain platform, and all the user data is stored in the data storage device, a "blockchain expansion problem", a "privacy problem", and a "problem of right to be forgotten" that is caused by data anti-tampering are avoided.

In a possible implementation of the second aspect, after the data storage device executes the corresponding task based on the second request, the method further includes: The data storage device sends response information to the blockchain platform, where the response information indicates that the data storage device has executed the task corresponding to the second request.

In a possible implementation of the second aspect, after the data storage device executes the corresponding task based on the second request, the method further includes: The data storage device sends confirmation information to the data request device, where the confirmation information indicates that the data storage device has executed the task corresponding to the second request.

A third aspect of embodiments of this application provides a user data management method. The method is used by a user data management system to manage user data. The system includes a data request device, a data storage device, and a blockchain platform. When the data request device needs to access the data storage device, the user data management system performs a corresponding operation. Specifically, the method includes: The blockchain platform receives a first request sent by the data request device, where the first request indicates that the data request device needs to access the data storage device, and the first request includes signature information of the data request device and an access type. The blockchain platform determines, based on the signature information of the data request device and the access type, whether the data request device is capable of accessing the data storage device. The blockchain platform sends first permission information to the data request device, where the first permission information indicates whether the data request device is capable of accessing the data storage device. The blockchain platform receives an access verification request sent by the data storage device, where the access verification request indicates that the data request device sends a second request to the data storage device. If the blockchain platform determines that the data request device is capable of accessing the data storage device, the blockchain platform sends second permission information to the data storage device, where the second permission information indicates that the data storage device is capable of executing a task corresponding to the second request.

Before accessing the data storage device, the data request device needs to obtain that the blockchain platform confirms that the data request device has the corresponding permission. Because the blockchain platform has features such as decentralization and anti-tampering, the blockchain platform having authentication and authorization functions has no risk of a single-point failure, and relatively little data is lost when the blockchain platform is attacked by a network. As a result, the user data has higher security. In another aspect, the first request includes the access type, and access information is further refined, so that the blockchain platform can more accurately determine permission corresponding to the first request.

In a possible implementation of the third aspect, after the blockchain platform sends second permission information to the data storage device, the method further includes: The blockchain platform receives response information sent by the data storage device, where the response information indicates that the data storage device has executed the task corresponding to the second request. The blockchain platform records, in a distributed ledger based on the response message, the task that corresponds to the second request and that has been executed by the data storage device.

In this possible implementation, because transactions such as access to the user data are recorded in the distributed ledger, the user data is not entirely managed by a mobile communication network provider. A user has complete permission to know and control personal data of the user, and the user may know whether the mobile communication network provider properly uses user information and effectively protects the user information.

In a possible implementation of the third aspect, if the access type is data reading, the first permission information includes an access address.

A fourth aspect of this application provides a data request device. The data request device has a function of implementing the method in any one of the first aspect or the possible implementations of the first aspect. The function may be implemented by hardware, or may be implemented by hardware executing corresponding software. The hardware or the software includes one or more modules corresponding to the foregoing function, for example, a first sending module.

A fifth aspect of this application provides a data storage device. The data storage device has a function of implementing the method in any one of the second aspect or the possible implementations of the second aspect. The function may be implemented by hardware, or may be implemented by hardware executing corresponding software. The hardware or the software includes one or more modules corresponding to the foregoing function, for example, a first receiving module.

A sixth aspect of this application provides a blockchain platform device. The blockchain platform device has a function of implementing the method in any one of the third aspect or the possible implementations of the third aspect. The function may be implemented by hardware, or may be implemented by hardware executing corresponding software. The hardware or the software includes one or more modules corresponding to the foregoing function, for example, a first receiving module.

A seventh aspect of this application provides a data request device. The data request device includes at least one processor, a memory, an input/output (I/O) interface, and computer-executable instructions that are stored in the memory and that is executable on the processor. When the computer-executable instructions are executed by the processor, the processor performs the method in any one of the first aspect or the possible implementations of the first aspect.

An eighth aspect of this application provides a data storage device. The data storage device includes at least one processor, a memory, an input/output (I/O) interface, and computer-executable instructions that are stored in the memory and that is executable on the processor. When the computer-executable instructions are executed by the processor, the processor performs the method in any one of the second aspect or the possible implementations of the second aspect.

A ninth aspect of this application provides a blockchain platform device. The blockchain platform device includes at least one processor, a memory, an input/output (I/O) interface, and computer-executable instructions that are stored in the memory and that is executable on the processor. When the computer-executable instructions are executed by the processor, the processor performs the method in any one of the third aspect or the possible implementations of the third aspect.

A tenth aspect of this application provides a computer-readable storage medium storing one or more computer-executable instructions. When the computer-executable instructions are executed by a processor, the processor performs the method in any one of the first aspect or the possible implementations of the first aspect.

An eleventh aspect of this application provides a computer-readable storage medium storing one or more computer-executable instructions. When the computer-executable instructions are executed by a processor, the processor performs the method in any one of the second aspect or the possible implementations of the second aspect.

A twelfth aspect of this application provides a computer-readable storage medium storing one or more computer-executable instructions. When the computer-executable instructions are executed by a processor, the processor performs the method in any one of the third aspect or the possible implementations of the third aspect.

A thirteenth aspect of this application provides a computer program product storing one or more computer-executable instructions. When the computer-executable instructions are executed by a processor, the processor performs the method in any one of the first aspect or the possible implementations of the first aspect.

A fourteenth aspect of this application provides a computer program product storing one or more computer-executable instructions. When the computer-executable instructions are executed by a processor, the processor performs the method in any one of the second aspect or the possible implementations of the second aspect.

A fifteenth aspect of this application provides a computer program product storing one or more computer-executable instructions. When the computer-executable instructions are executed by a processor, the processor performs the method in any one of the third aspect or the possible implementations of the third aspect.

A sixteenth aspect of this application provides a chip system. The chip system includes at least one processor, and the at least one processor is configured to implement the function in any one of the first aspect or the possible implementations of the first aspect. In a possible design, the chip system may further include a memory. The memory is configured to store program instructions and data that are necessary for an artificial intelligence model processing apparatus. The chip system may include a chip, or may include a chip and another discrete component.

A seventeenth aspect of this application provides a chip system. The chip system includes at least one processor, and the at least one processor is configured to implement the function in any one of the second aspect or the possible implementations of the second aspect. In a possible design, the chip system may further include a memory. The memory is configured to store program instructions and data that are necessary for an artificial intelligence model-based data processing apparatus. The chip system may include a chip, or may include a chip and another discrete component.

An eighteenth aspect of this application provides a chip system. The chip system includes at least one processor, and the at least one processor is configured to implement the function in any one of the third aspect or the possible implementations of the third aspect. In a possible design, the chip system may further include a memory. The memory is configured to store program instructions and data that are necessary for an artificial intelligence model-based data processing apparatus. The chip system may include a chip, or may include a chip and another discrete component.

According to the foregoing technical solutions, it can be learned that embodiments of this application have the following advantages:

In embodiments of this application, when the data request device needs to perform an operation on data, the data request device needs to obtain the first permission information sent by the blockchain platform, to avoid risks of the single-point failure and the attack from the network, and have high data security. In another aspect, because the first request sent by the data request device includes the signature information of the data request device, it is ensured that this operation is authorized by the user, and it is ensured that the user can learn whether the mobile communication network provider properly uses the user information, to effectively protect the user information for security.

DESCRIPTION OF EMBODIMENTS

Embodiments of this application provide a user data management method and a related device, to improve user information security.

The following describes embodiments of this application with reference to the accompanying drawings. The described embodiments are merely some but not all of embodiments of this application. A person of ordinary skill in the art may learn that, with development of technologies and emergence of new scenarios, the technical solutions provided in embodiments of this application are also applicable to a similar technical problem.

In the specification, claims, and accompanying drawings of this application, the terms "first", "second", and the like are intended to distinguish between similar objects but do not necessarily indicate a specific order or sequence. It should be understood that the terms in such a way are interchangeable in proper circumstances, so that embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

User data management is one of the most central functions of a mobile communication network. Provision of a user service and normal operating of the network need to depend on a user data management entity and a related procedure. The user data management entity of the mobile network stores user and service subscription related data, key information, and the like, and is the key to implementing user authentication, authorization, and access control.

Figure 1:
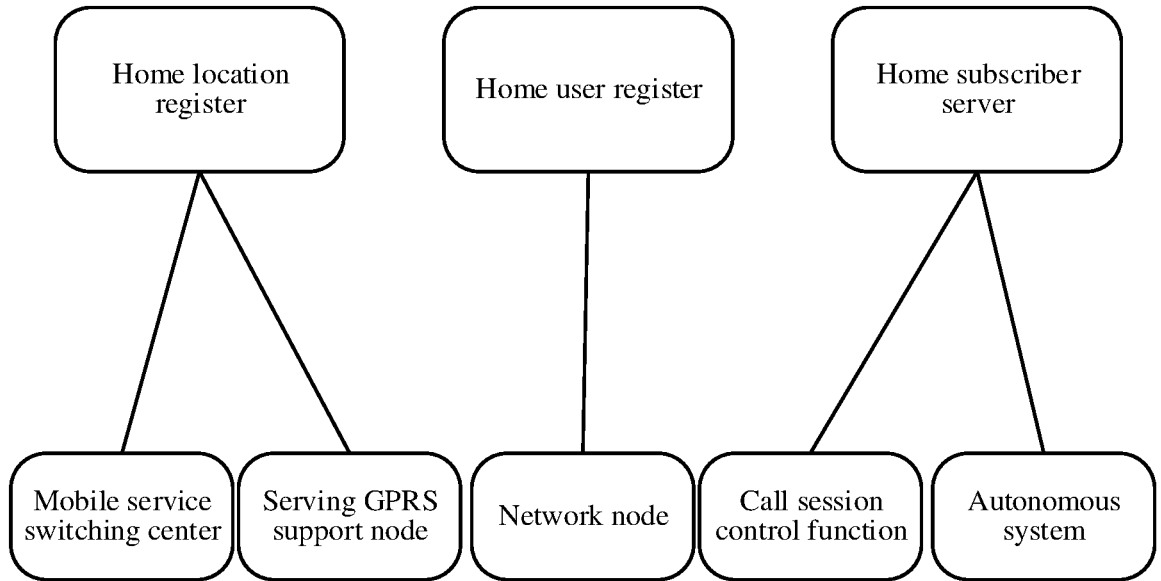
FIG. 1 is an example schematic diagram of a network architecture of a user data architecture of a 2G/3G/4G/IMS network.
Figure 2:
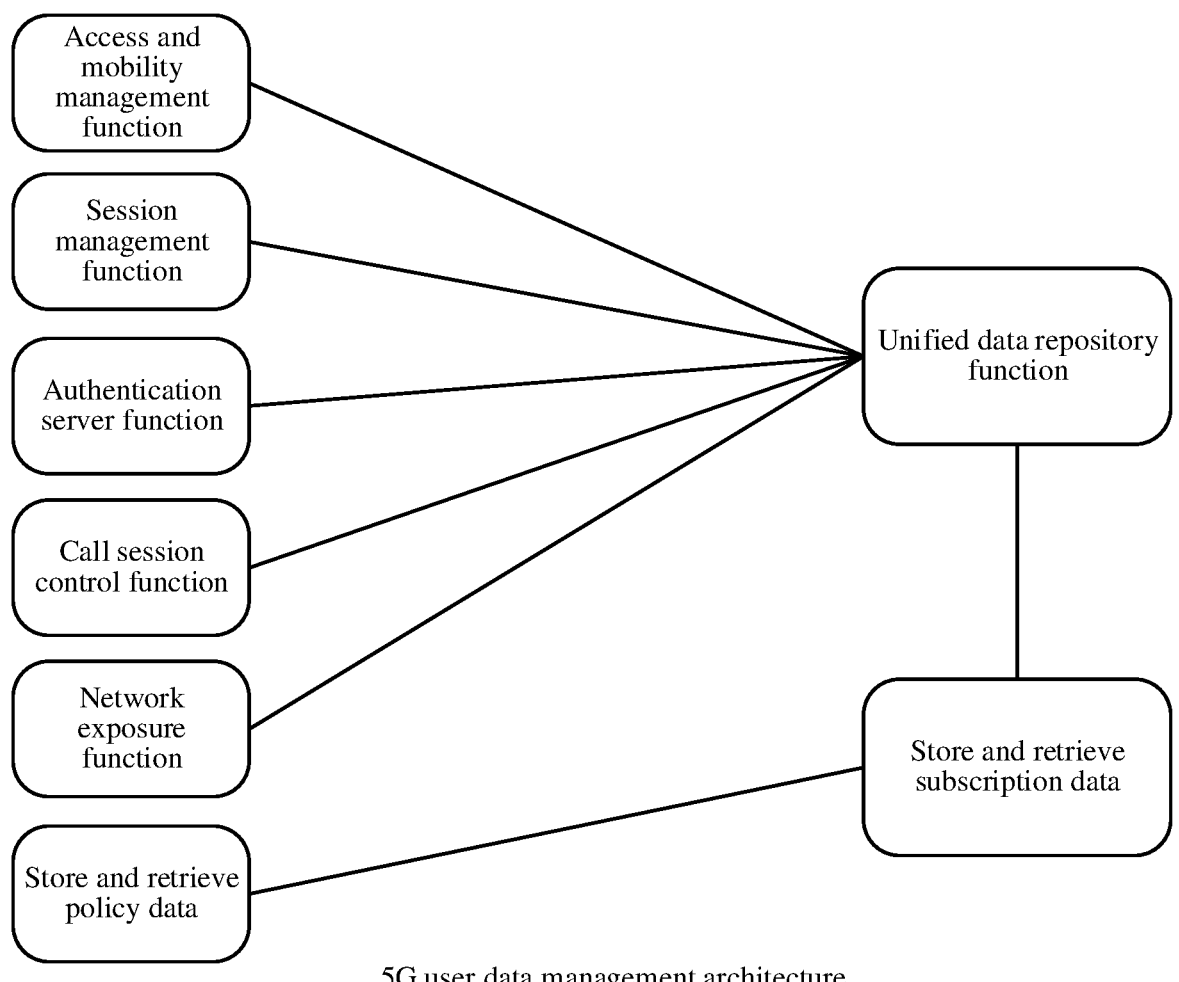
FIG. 2 is an example schematic diagram of a network architecture of a user data architecture of a 5G network.

In current 2G to 5G core network architectures, each user has much information, such as subscription information, key information, and service information. The user information is processed together in a centralized single-point user data management device. The user data management device is connected to another control panel network entity or an application server, to provide data access and fetch services, and the like. As shown in FIG. 1, for example, user data management entities in 2G, 3G, 4G, and internet protocol multimedia subsystem (IP Multimedia Subsystem, IMS) architectures are a home location register (HLR) and a home subscriber server (HSS), and these entities interface with another control plane network function entity or an application server, to provide access and fetch services. As shown in FIG. 2, for example, in a core network architecture of a 5G network, user information is managed by a unified data management (UDM). The UDM manages network user data in a single element and may be paired with a user data repository. The user data repository stores user information. The UDM is located on a control plane.

Based on the foregoing mobile communication network, the following describes a user data management method in embodiments of this application.

Figure 3:
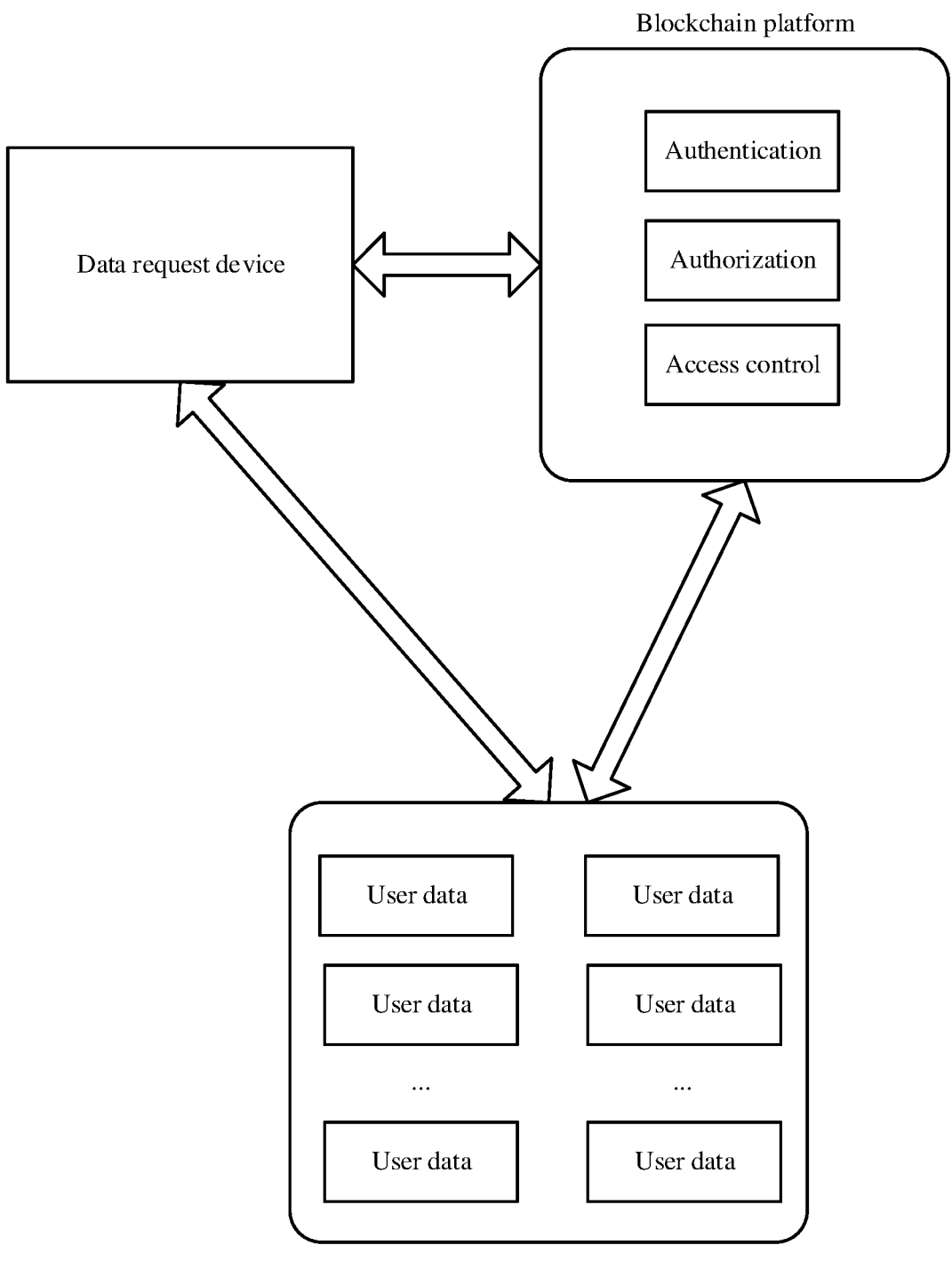
FIG. 3 is an example schematic diagram of a scenario of a user data management method according to an embodiment of this application.

As shown in FIG. 3, embodiments of this application provide a user data management method. A user data management system in this application includes a data request device, a blockchain platform, and a data storage device. The data request device is a device that needs to perform a corresponding operation on user data, and may be a device such as a data subject (DS), a data control device (DC), and a data processing device (DP), or may be user equipment, an access network device, and a core network element. The user equipment may be a terminal device such as a notebook computer, a tablet computer, a computer, an LTE assistant terminal, an NR assistant terminal, an assistant, a semi-active tag, an active tag, a wireless relay station, an LTE mobile phone, and an NR mobile phone. The access network device may be an access network device such as a macro base station, a pole base station, a long term evolution (LTE) base station, an evolved NodeB (eNB), a wireless relay station, a femto base station, a pico base station, and a next generation NodeB (gNB). The core network element may be a core network element such as an authentication server or a session management server. Embodiments of this application may be used in an existing 5G system, and may also be used in various future communication systems and scenarios, such as the internet of vehicles, massive user access, satellite communication, and cellular communication.

The blockchain platform is configured to store a data operation, a policy management transaction, and a data pointer. The data pointer points to user data stored in the data storage device. Specifically, in one aspect, the blockchain platform implements decentralization, and implements access authentication, authorization, and access control logic. In another aspect, all data operations and policy management are recorded in a distributed ledger that cannot be tampered with. The access record includes a storage address and an access policy of personal user data. In embodiments of this application, a centralized trust mode is eliminated by using features such as decentralization, tamper-resistant, traceability, and transparency of the blockchain platform. To be specific, the blockchain platform acts as an authentication and authorization server, and the blockchain platform performs authentication and authorization on all operations of the data request device. In addition, a smart contract deployed on the blockchain platform is responsible for automatic access control management, and the blockchain platform is responsible for a log system that cannot be tampered with, and is configured to record any access operation on data in the chain.

The data storage device is configured to store personal data of a user, and the personal data of the user is not stored on the blockchain platform, to resolve a "blockchain expansion problem", a "privacy problem", and a "problem of right to be forgotten" caused by data anti-tampering of the blockchain platform.

In embodiments of this application, the user equipment may initiate an access request for user data, and an operator network function device, that is, the data control device DC or the data processing device DP, may also initiate an access request for user data. Details are separately described below.

1. User equipment initiates an operation request for user data.

Figure 4:
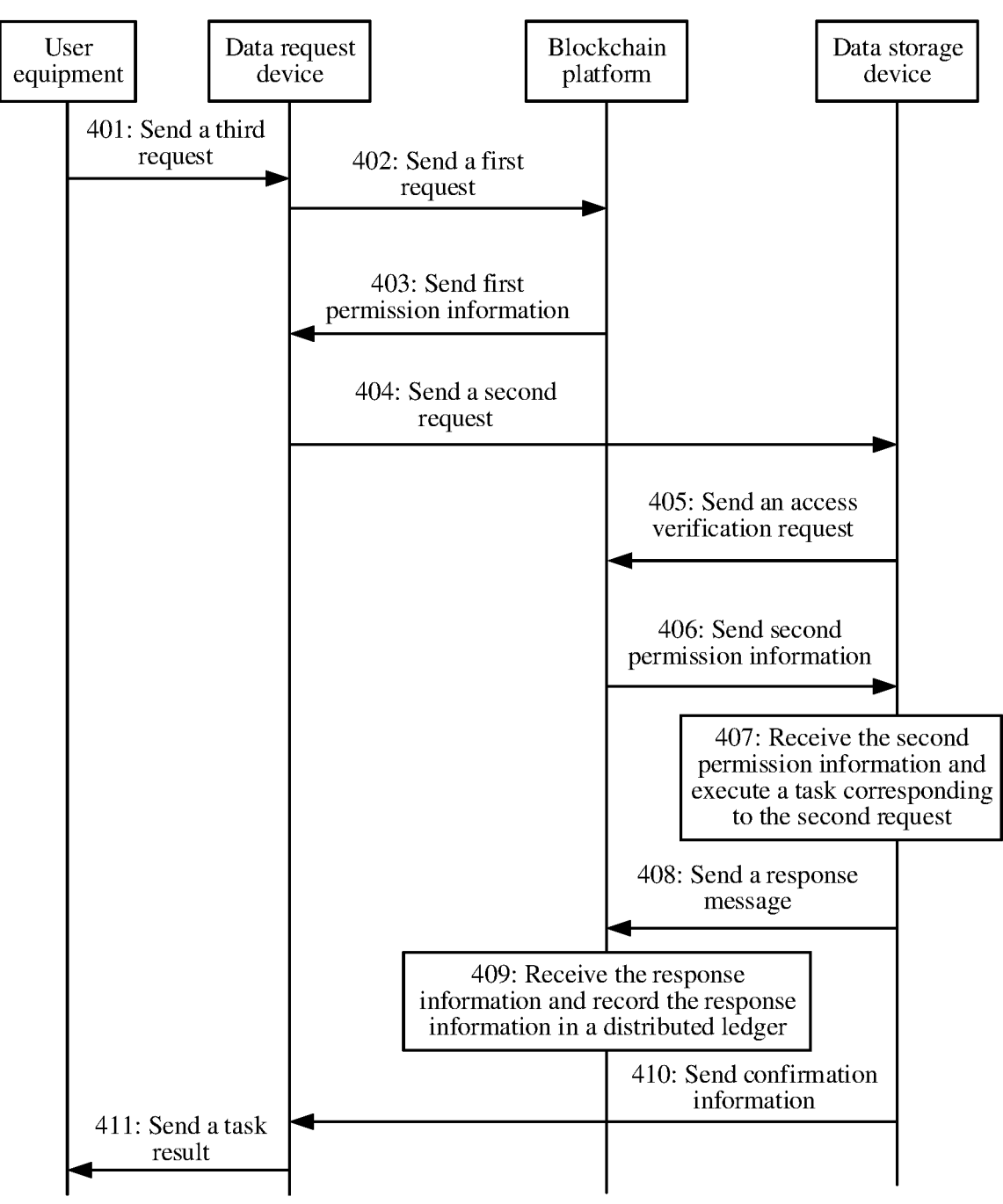
FIG. 4 is an example schematic flowchart of a user data management method according to an embodiment of this application.

As shown in FIG. 4, a procedure of a user data management method in an embodiment of this application includes the following steps.

401: User equipment sends a third request to a data request device.

When the user equipment requires a data storage device to execute a corresponding task, the user equipment sends the third request to the data request device, where the third request indicates the data request device to send a first request to a blockchain platform, and the third request includes signature information of the user equipment.

Figure 5:
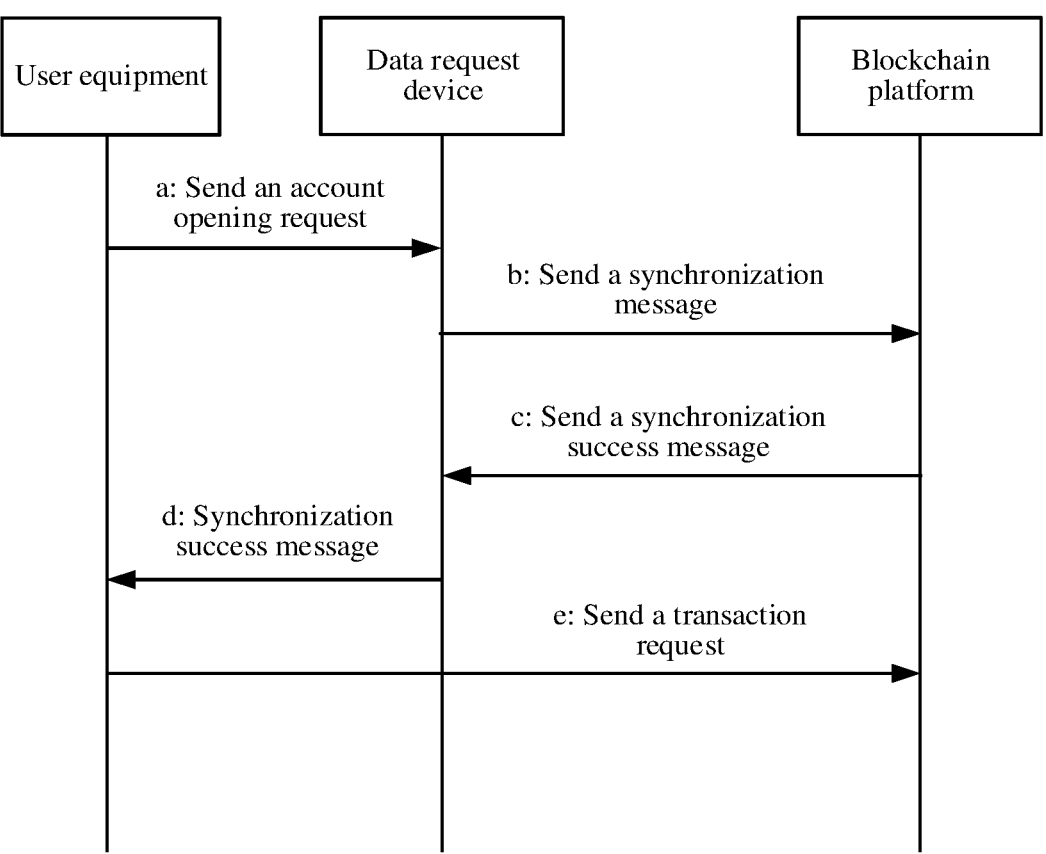
FIG. 5 is another example schematic flowchart of a user data management method according to an embodiment of this application.

Specifically, as shown in FIG. 5, in a possible implementation, when a user needs to open an account, the following steps may be performed.

Step a: The user equipment, that is, a data subject, sends an account opening request to a customer relation management (CRM) device or a business operation support system (BOSS) of a mobile service operator, where the account opening request indicates that the user needs to create a new user account, and the account opening request includes user information corresponding to the user.

Step b: The CRM device receives the account opening request sent by the user equipment, and then performs user data verification based on the user information in the account opening request. If the user data verification on the user information of the user succeeds, that is, a preset user condition is met, for example, the user information of the user is true and valid or the user information of the user complies with related laws and regulations, the CRM device creates a customer record for the user, and the CRM device sends synchronization information to the BOSS, so that the BOSS synchronizes the user information with the CRM device based on the synchronization information.

Step c: The BOSS receives the synchronization information sent by the CRM, and synchronizes the user information with the CRM device based on the synchronization information; and then the BOSS creates a customer data record and sends synchronization success information to the CRM, so that the CRM forwards the synchronization success information to the user equipment, where the synchronization success information indicates that user data is generated successfully and the CRM device is synchronized with the BOSS successfully.

Step d: The CRM device receives the synchronization success information sent by the BOSS, and forwards the synchronization success information to the user equipment, where the synchronization success information sent to the user equipment may trigger the user equipment to initiate a transaction request, that is, a third request.

Step e: The user equipment receives the synchronization success information sent by the CRM device, and then the user equipment initiates a transaction request to the CRM device and the BOSS, where the transaction request indicates the BOSS to initiate a transaction registry Treg, that is, a first request, to the blockchain platform.

Figure 6:
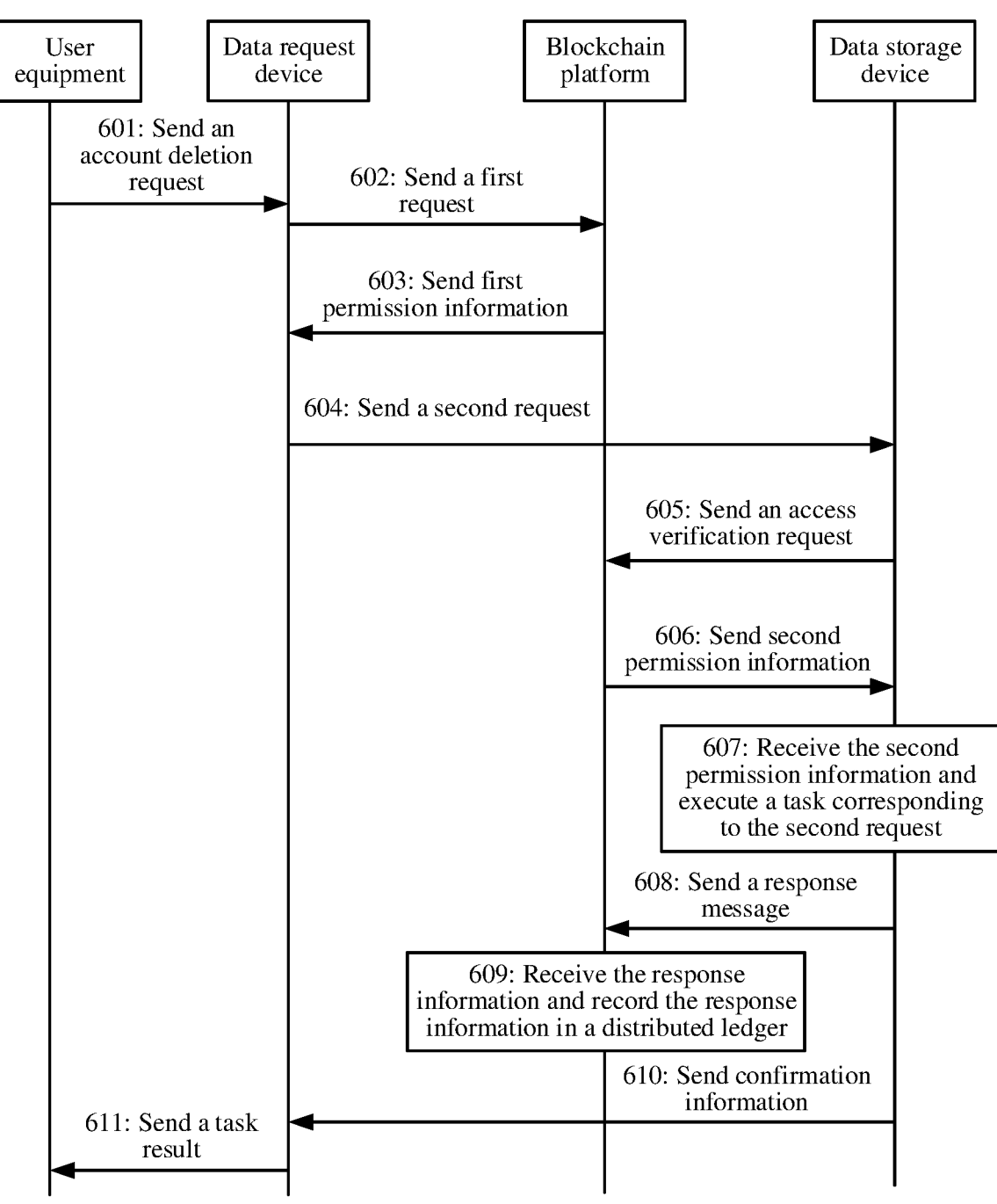
FIG. 6 is another example schematic flowchart of a user data management method according to an embodiment of this application.

As shown in FIG. 6, in a possible implementation, when the user needs to delete an account, the following step may be performed: The user equipment sends an account deletion request to the data request device such as the CRM device and the BOSS, where the account deletion request is the third request.

Figure 7:
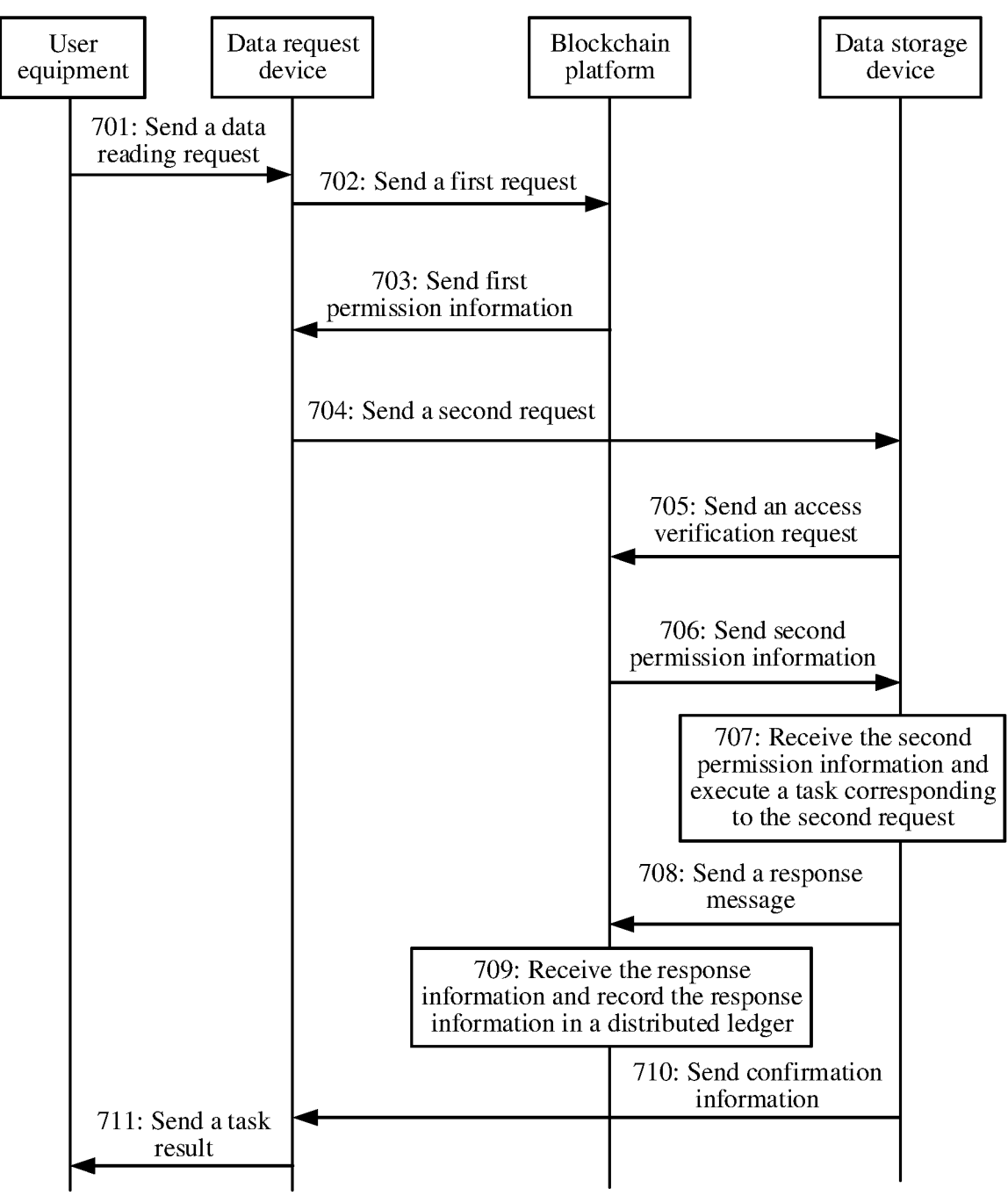
FIG. 7 is another example schematic flowchart of a user data management method according to an embodiment of this application.

As shown in FIG. 7, in a possible implementation, when the user needs to access personal user data, the following step may be performed: The user equipment sends a data reading request to the data request device such as the CRM device and the BOSS, where the data reading request is the third request.

402: The data request device sends the first request to the blockchain platform.

The data request device sends the first request to the blockchain platform, where the first request indicates that the data request device needs to access the data storage device, the first request includes signature information of the data request device and an access type, and the signature information of the data request device is used by the blockchain platform to determine permission corresponding to the first request.

In this embodiment of this application, the access type may be data writing shown in FIG. 5, data deletion shown in FIG. 6, and data reading shown in FIG. 7. In addition, the access type in this embodiment of this application may alternatively be another type, for example, data modification. This is not specifically limited herein.

In this embodiment of this application, the first request includes the signature information of the data request device and the access type. In addition, in this embodiment of this application, the first request may include user equipment information or related information about the task that the user equipment requires the data storage device to execute. For example, when the access type is the data writing, the first request further includes an access address, and the access address may be a data pointer. This is not specifically limited herein.

In this embodiment of this application, the signature information of the data request device may include the signature information of the data request device, or may include the signature information of the user equipment, or may include electronic signature information of the data request device and the signature information of the user equipment, or may be other information that may indicate the data request device or the user equipment. This is not specifically limited herein. In this embodiment of this application, the signature information may be an electronic signature, or may be identification information such as an ID. This is not specifically limited herein.

In this embodiment of this application, the data request device is a device other than the user equipment, for example, a core network element or an access network device. In addition, the data request device may alternatively be user equipment such as a terminal. If the data request device is user equipment, step 401 is not performed, and the user equipment directly sends the first request to the blockchain platform. This is not specifically limited herein.

Specifically, as shown in FIG. 5, in a possible implementation, when the user needs to open the account, the following step may be performed: After the data request device, for example, the BOSS, receives the transaction initiated by the user equipment, the BOSS initiates the transaction registry Treg request, that is, the first request, to the blockchain platform. The transaction Treg request, that is, the first request, includes the user information, the data pointer, an access policy, that is, the access type, and a digital signature of the user. The digital signature is used by the blockchain platform to determine whether the request is initiated by the user, that is, determine authenticity of the first request, and determine whether the first request is known by the user and confirmed by the user, to determine the permission corresponding to the first request.

Specifically, as shown in FIG. 6, in a possible implementation, when the user needs to delete the account, the following step may be performed: The data request device, for example, the CRM device and the BOSS, deletes a user relationship and a subscription relationship of the user, and sends a Tdereg request to the blockchain platform, where the Tdereg request includes signature information of the user and the access type, and the Tdereg request is the first request.

Specifically, as shown in FIG. 7, in a possible implementation, when the user needs to access the personal user data, the following step may be performed: A data control device and a data processing device, for example, the CRM device and the BOSS, send a Tdata data reading request, that is, the first request, to the blockchain platform.

403: The blockchain platform sends first permission information to the data request device.

If the blockchain platform determines, based on the signature information, that the data request device is capable of accessing the data storage device, the blockchain platform sends the first permission information to the data request device, where the first permission information indicates whether the data request device is capable of accessing the data storage device.

In a possible implementation, when the access type is data reading, the first permission information further includes an access address, where the access address may be a data pointer.

Specifically, after receiving the first request sent by the data request device, the blockchain platform determines the permission of the first request based on the signature information of the data request device and the access type that are included in the first request. Because the digital signature information has unique authenticity and reliability, that is, the digital signature may be used to uniquely determine the data request device, and the digital signature is used by the blockchain platform to determine whether the request is initiated by the user equipment, that is, determine authenticity of the first request, and determine whether the first request is known by the user equipment and confirmed by the user equipment, to determine the permission corresponding to the first request, that is, determine whether the data request device that sends the first request has the permission to access the data storage device and enable the data storage device to execute the corresponding task. After the blockchain platform determines that the data request device is capable of accessing the data storage device, that is, the data request device has the corresponding permission, the blockchain platform sends the first permission information to the data request device, where the first permission information indicates that the data request device is capable of accessing the data storage device, that is, the first request has the permission corresponding to the task corresponding to the first request.

Specifically, as shown in FIG. 5, in a possible implementation, when the user needs to open the account, the following step may be performed: The blockchain platform checks related information included in the transaction Treg request, including whether a registration and account opening transaction is initiated by the user equipment, the access policy corresponding to the request, that is, the access type, whether the signature is a valid digital signature of the user equipment, and the like. After determining that the user has related permission, for example, the user equipment has permission to read and write all personal user data and policy data, the blockchain platform sends the first permission information to the data request device.

Specifically, as shown in FIG. 6, in a possible implementation, when the user needs to delete the account, the following step may be performed: The blockchain platform checks related information included in the transaction Tdereg request, including whether an account deletion transaction is initiated by the user equipment, the access type corresponding to the request, whether the signature is a valid digital signature of the user, and the like. After determining that the user has related permission, for example, the user has permission to delete all personal user data and policy data, the blockchain platform sends the first permission information to the data request device.

Specifically, as shown in FIG. 7, in a possible implementation, when the user needs to read the personal user data, the following step may be performed: The blockchain platform checks related information included in the transaction Tdata request, including whether an access transaction is initiated by the user, whether the signature is a valid digital signature of the user, and the like. After determining that the user has related permission, for example, the user has permission to access all personal user data and policy data, the blockchain platform sends the first permission information to the data request device, where the first permission information includes the access address, and the address may be the data pointer.

404: The data request device sends a second request to the data storage device.

After the data request device receives the first permission information, if the first permission information indicates that the data request device has the permission to access the data storage device, the data request device learns that the blockchain platform has determined that the data request device is capable of accessing the data storage device, and then the data request device sends the second request to the data storage device, where the second request indicates the data storage device to execute a task corresponding to the second request. The second request includes the signature information of the user.

Specifically, as shown in FIG. 5, in a possible implementation, when the user needs to open the account, the following step may be performed: The data request device sends the second request to the data storage device, where the second request includes task information such as the signature information of the user, the data pointer, the second request indicates the data storage device to write data for the user, and a data address is provided by the data pointer.

Specifically, as shown in FIG. 6, in a possible implementation, when the user needs to delete the account, the following step may be performed: The data request device sends the second request to the data storage device, where the second request includes task information such as the signature information of the user, the data pointer, the second request indicates the data storage device to delete the user data of the user, and a data address may be provided by the data pointer.

Specifically, as shown in FIG. 7, in a possible implementation, when the user needs to access the personal user data, the following step may be performed: The data request device sends the second request to the data storage device, where the second request includes task information such as the signature information of the user, the data pointer, the second request indicates the data storage device to send user data corresponding to the second request to the data request device, and a data address may be provided by the data pointer.

The data storage device sends an access verification request to the blockchain platform.

After the data storage device receives the second request sent by the data request device, because the second request indicates the data storage device to execute the corresponding task, the data storage device needs to determine whether the second request has permission corresponding to the task. In this case, the data storage device sends the access verification request to the blockchain platform, where the access verification request indicates that the data request device sends the second request to the data storage device, and the access verification request includes related information of the second request, so that the blockchain platform determines permission information of the second request based on the related information of the second request.

406: The blockchain platform sends second permission information to the data storage device.

After the blockchain platform receives the access verification request sent by the data storage device, the blockchain platform determines, based on the related information of the second request in the access verification request, whether the second request has the corresponding permission, that is, whether the data storage device is capable of accessing the data storage device. Then, the blockchain platform sends the second permission information to the data storage device, where the second permission information may indicate whether the data storage device is capable of executing the task corresponding to the second request.

407: The data storage device receives the second permission information and executes the task corresponding to the second request.

The data storage device receives the second permission information sent by the blockchain platform, where the second permission information indicates whether the data storage device is capable of executing the task corresponding to the second request, that is, whether the permission of the user equipment corresponding to the signature information included in the second request enables the data storage device to execute the task corresponding to the second request. If the second permission information indicates that the data storage device is capable of executing the task corresponding to the second request, the data storage device is capable of executing the task corresponding to the second request after receiving the second permission information.

Specifically, as shown in FIG. 5, in a possible implementation, when the user needs to open the account, the following step may be performed: The data storage device receives the second permission information, and after determining that the task corresponding to the second request can be executed, writes the corresponding data based on the data pointer in the second request, where the data address is provided by the data pointer.

Specifically, as shown in FIG. 6, in a possible implementation, when the user needs to delete the account, the following step may be performed: The data storage device receives the second permission information, and after determining that the task corresponding to the second request can be executed, deletes the user data of the user based on the data pointer in the second request, where the data address may be provided by the data pointer.

Specifically, as shown in FIG. 7, in a possible implementation, when the user needs to access the personal user data, the following step may be performed: The data storage device receives the second permission information, and after determining that the task corresponding to the second request can be executed, sends, based on the second request, the user data corresponding to the second request to the data request device, where the data address may be provided by the data pointer.

408: The data storage device sends response information to the blockchain platform.

After completing the task corresponding to the second request, the data storage device sends the response information to the blockchain platform. The response information indicates that the data storage device has completed the task corresponding to the second request. The response information includes related information of the task, for example, result information of the task, identification information of the user who initiates the task, an execution policy of the task, and related information of the data storage device that executes the task.

409: The blockchain platform receives the response information and records the response information in a distributed ledger.

The blockchain platform receives the response information sent by the data storage device, where the response information indicates that the data storage device has completed the task corresponding to the second request. Correspondingly, the response information includes the related information of the task, for example, the result information of the task, the identification information of the user who initiates the task, the execution policy of the task, and the related information of the data storage device that executes the task. Then, the blockchain platform may broadcast the related information of the task to each node of the blockchain platform. After all the nodes reach a consensus, the blockchain platform records the related information of the task in the distributed ledger that cannot be tampered with on the blockchain platform. Each node of the blockchain platform records the complete related information of the task, and storage of each node is independent and has a same level.

Specifically, as shown in FIG. 5, in a possible implementation, when the user needs to open the account, the following step may be performed: The blockchain platform checks and receives the response information sent by the data storage device, and records the transaction Treg in the distributed ledger.

Specifically, as shown in FIG. 6, in a possible implementation, when the user needs to delete the account, the following step may be performed: The blockchain platform checks and receives the response information sent by the data storage device, and records the transaction Tdereg in the distributed ledger.

Specifically, as shown in FIG. 7, in a possible implementation, when the user needs to access the personal user data, the following step may be performed: The blockchain platform checks and receives the response information sent by the data storage device, and records the transaction Tdata in the distributed ledger.

410: The data storage device sends confirmation information to the data request device.

The data storage device sends a confirmation message to the data request device, where the confirmation message indicates that the data storage device has completed the task corresponding to the second request.

In this embodiment of this application, the data storage device may first perform step 408 and then perform step 410, or may first perform step 410 and then perform step 408, or may perform two steps at the same time. This is not specifically limited herein.

411: The data storage device sends task result information to the user equipment.

The data storage device sends the task result information to the user equipment, where the task result information indicates whether the data storage request device has completed the task corresponding to the second request.

In this embodiment of this application, the user equipment initiates an access request for user data. In addition, an operator network function device, that is, the data control device or the data processing device, may also initiate an access request for user data. Details are described below.

2. An operator network function device may initiate an operation request for user data.

Figure 8:
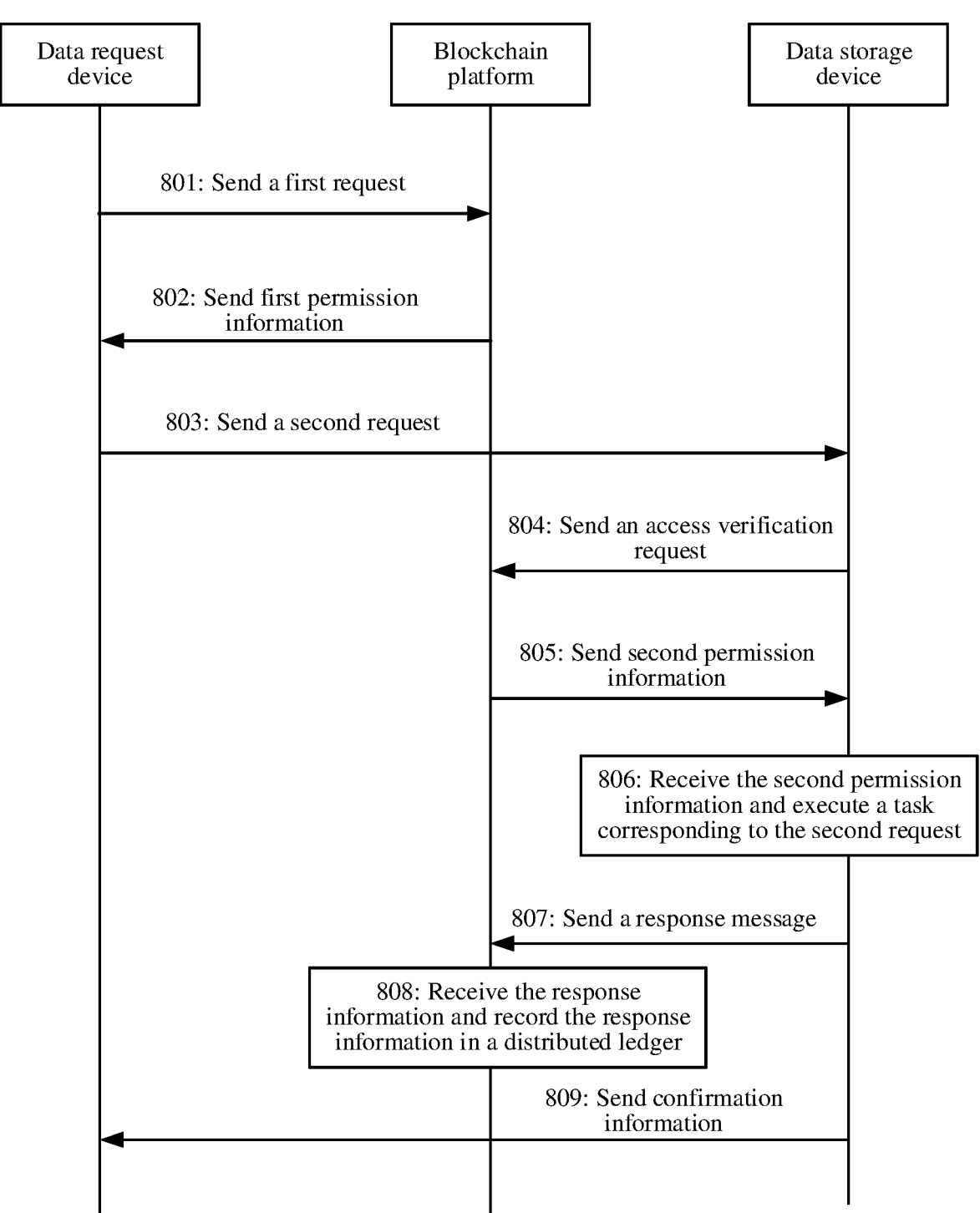
FIG. 8 is another example schematic flowchart of a user data management method according to an embodiment of this application.

As shown in FIG. 8, a procedure of a user data management method in an embodiment of this application includes the following steps.

801: A data request device sends a first request to a blockchain platform.

The data request device sends the first request to the blockchain platform. The first request indicates that the data request device needs to access a data storage device. The first request includes signature information of the data request device, that is, a network function device, user information, and an access type. The user information is information about a user corresponding to user data that the network function device needs to access. The signature information of the data request device is used by the blockchain platform to determine permission corresponding to the first request.

In this embodiment of this application, the access type may be data writing, data deletion, and data reading. In addition, the access type in this embodiment of this application may alternatively be another type. This is not specifically limited herein.

In this embodiment of this application, the first request includes the signature information of the data request device and the access type. In addition, in this embodiment of this application, the first request may include user equipment information or related information about a task that user equipment requires the data storage device to execute. For example, when the access type is the data writing, the first request further includes an access address, and the access address may be a data pointer. This is not specifically limited herein.

In this embodiment of this application, the signature information may be an electronic signature, or may be identification information such as an ID. This is not specifically limited herein.

802: The blockchain platform sends first permission information to the data request device.

If the blockchain platform determines, based on the signature information, that the data request device is capable of accessing the data storage device, the blockchain platform sends the first permission information to the data request device, where the first permission information indicates whether the data request device is capable of accessing the data storage device.

In a possible implementation, when the access type is data reading, the first permission information further includes an access address, where the access address may be a data pointer.

Specifically, after receiving the first request sent by the data request device, the blockchain platform determines the permission of the first request based on the signature information of the data request device and the access type that are included in the first request. Because the digital signature information has unique authenticity and reliability, that is, the digital signature may be used to uniquely determine the data request device, and the digital signature is used by the blockchain platform to determine whether the request is initiated by the user equipment, that is, determine authenticity of the first request, and determine whether the first request is known by the user equipment and confirmed by the user equipment, to determine the permission corresponding to the first request, that is, determine whether the data request device that sends the first request has the permission to access the data storage device and enable the data storage device to execute the corresponding task. After the blockchain platform determines that the data request device is capable of accessing the data storage device, that is, the first request has the corresponding permission, the blockchain platform sends the first permission information to the data request device, where the first permission information indicates that the data request device is capable of accessing the data storage device, that is, the first request has the permission corresponding to the task corresponding to the first request.

803: The data request device sends a second request to the data storage device.

After the data request device receives the first permission information, if the first permission information indicates that the data request device has the permission to access the data storage device, the data request device learns that the blockchain platform has determined that the data request device is capable of accessing the data storage device, and then the data request device sends the second request to the data storage device, where the second request indicates the data storage device to execute a task corresponding to the second request. The second request includes the signature information of the data request device.

804: The data storage device sends an access verification request to the blockchain platform.

After the data storage device receives the second request sent by the data request device, because the second request indicates the data storage device to execute the corresponding task, the data storage device needs to determine whether the second request has permission corresponding to the task. In this case, the data storage device sends the access verification request to the blockchain platform, where the access verification request indicates that the data request device sends the second request to the data storage device, and the access verification request includes related information of the second request, so that the blockchain platform determines permission information of the second request based on the related information of the second request.

805: The blockchain platform sends second permission information to the data storage device.

After the blockchain platform receives the access verification request sent by the data storage device, the blockchain platform determines, based on the related information of the second request in the access verification request, whether the second request has the corresponding permission, that is, whether the data storage device is capable of accessing the data storage device. Then, the blockchain platform sends the second permission information to the data storage device, where the second permission information may indicate whether the data storage device is capable of executing the task corresponding to the second request.

806: The data storage device receives the second permission information and executes the task corresponding to the second request.

The data storage device receives the second permission information sent by the blockchain platform, where the second permission information indicates whether the data storage device is capable of executing the task corresponding to the second request, that is, whether the permission of the user equipment corresponding to the signature information included in the second request enables the data storage device to execute the task corresponding to the second request. If the second permission information indicates that the data storage device is capable of executing the task corresponding to the second request, the data storage device is capable of executing the task corresponding to the second request after receiving the second permission information.

807: The data storage device sends response information to the blockchain platform.

After completing the task corresponding to the second request, the data storage device sends the response information to the blockchain platform. The response information indicates that the data storage device has completed the task corresponding to the second request. The response information includes related information of the task, for example, result information of the task, identification information of the user who initiates the task, an execution policy of the task, and related information of the data storage device that executes the task.

808: The blockchain platform receives the response information and records the response information in a distributed ledger.

The blockchain platform receives the response information sent by the data storage device, where the response information indicates that the data storage device has completed the task corresponding to the second request. Correspondingly, the response information includes the related information of the task, for example, the result information of the task, identification information of the data request device that initiates the task, the execution policy of the task, and the related information of the data storage device that executes the task. Then, the blockchain platform may broadcast the related information of the task to each node of the blockchain platform. After all the nodes reach a consensus, the blockchain platform records the related information of the task in the distributed ledger that cannot be tampered with on the blockchain platform. Each node of the blockchain platform records the complete related information of the task, and storage of each node is independent and has a same level.

809: The data storage device sends confirmation information to the data request device.

The blockchain platform sends a confirmation message to the data request device, where the confirmation message indicates that the data storage device has completed the task corresponding to the second request.

In this embodiment of this application, the data storage device may first perform step 807 and then perform step 809, or may first perform step 809 and then perform step 807, or may perform two steps at the same time. This is not specifically limited herein.

Figure 9:
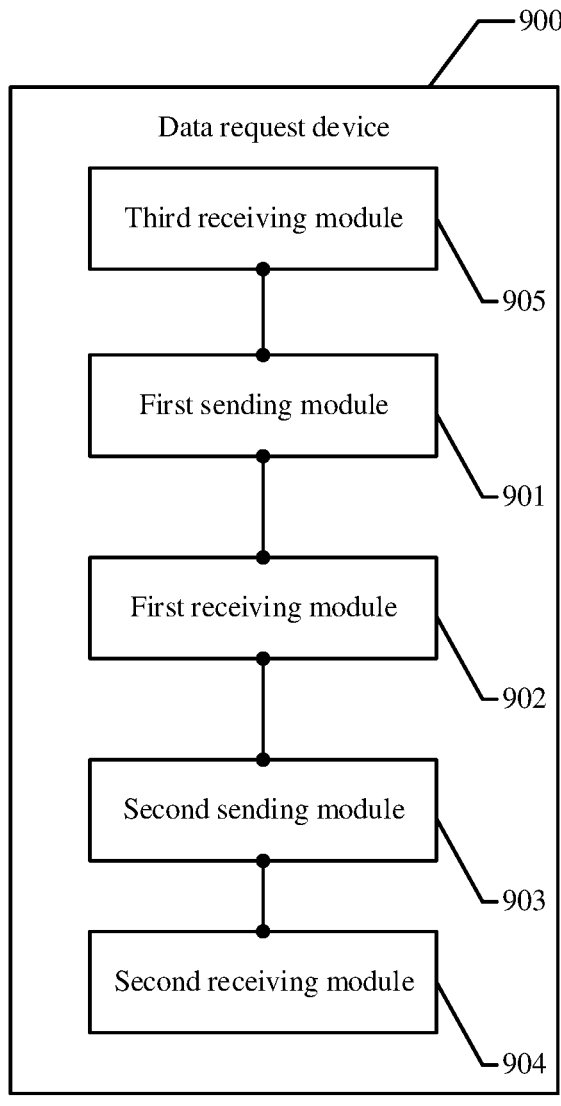
FIG. 9 is an example schematic diagram of a structure of a data request device according to an embodiment of this application.

The following describes a data request device in embodiments of this application. FIG. 9 provides a data request device 900 according to an embodiment of this application. The data request device may be the data request device in FIG. 4 to FIG. 8. The data request device 900 includes the following modules.

A first sending module 901 is configured to send a first request to a blockchain platform, where the first request indicates that the data request device needs to access a data storage device, and the first request includes signature information of the data request device and an access type. For a specific implementation, refer to step 402 in FIG. 4 in which the data request device sends the first request to the blockchain platform and step 801 in FIG. 8 in which the data request device sends the first request to the blockchain platform.

A first receiving module 902 is configured to receive first permission information sent by the blockchain platform, where the first permission information indicates whether the data request device has permission to access the data storage device, and the permission is related to the signature information of the data request device and the access type. For a specific implementation, refer to step 403 in FIG. 4 in which the blockchain platform sends the first permission information to the data request device and step 802 in FIG. 8 in which the blockchain platform sends the first permission information to the data request device.

A second sending module 903 is configured to: if the first permission information indicates that the data request device has the permission to access the data storage device, send a second request to the data storage device, where the second request includes an access address. For a specific implementation, refer to step 404 in FIG. 4 in which the data request device sends the second request to the data storage device and step 803 in FIG. 8 in which the data request device sends the second request to the data storage device.

A second receiving module 904 is configured to receive confirmation information sent by the data storage device, where the confirmation information indicates that the data storage device has executed a task corresponding to the second request. For a specific implementation, refer to step 410 in FIG. 4 in which the data storage device sends the confirmation information to the data request device and step 809 in FIG. 8 in which the data storage device sends the confirmation information to the data request device.

A third receiving module 905 is configured to receive a third request sent by user equipment, where the third request indicates the data request device to send the first request to the blockchain platform. For a specific implementation, refer to step 401 in FIG. 4 in which the user equipment sends the third request to the data request device.

In this embodiment, the data request device 900 may perform the operations performed by the data request device in the embodiment shown in any one of FIG. 4 to FIG. 8.

Figure 10:
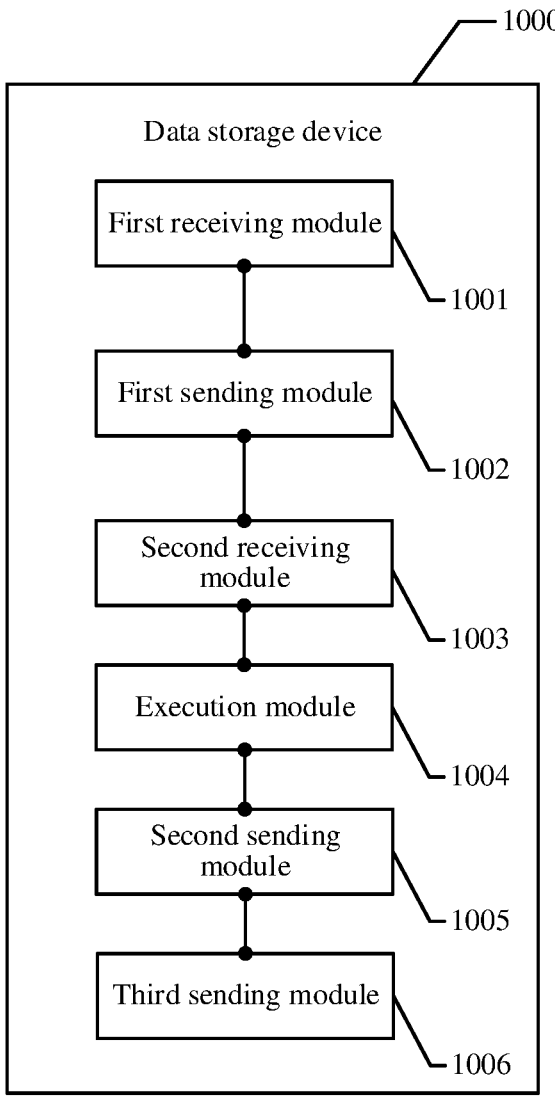
FIG. 10 is an example schematic diagram of a structure of a data storage device according to an embodiment of this application.

The following describes a data storage device in embodiments of this application. FIG. 10 provides a data storage device 1000 according to an embodiment of this application. The data storage device may be the data storage device in FIG. 4 to FIG. 8. The data storage device 1000 includes the following modules.

A first receiving module 1001 is configured to receive a second request of a data request device, where the second request includes an access address. For a specific implementation, refer to step 404 in FIG. 4 in which the data request device sends the second request to the data storage device and step 803 in FIG. 8 in which the data request device sends the second request to the data storage device.

A first sending module 1002 is configured to send an access verification request to a blockchain platform, where the access verification request indicates that the data request device sends the second request to the data storage device. For a specific implementation, refer to step 405 in FIG. 4 in which the data storage device sends the access verification request to the blockchain platform and step 804 in FIG. 8 in which the data storage device sends the access verification request to the blockchain platform.

A second receiving module 1003 is configured to receive second permission information sent by the blockchain platform, where the second permission information indicates whether the data storage device is capable of executing a task corresponding to the second request. For a specific implementation, refer to step 406 in FIG. 4 in which the blockchain platform sends the second permission information to the data storage device and step 805 in FIG. 8 in which the blockchain platform sends the second permission information to the data storage device.

An execution module 1004 is configured to: if the second permission information indicates that the data storage device is capable of executing the task corresponding to the second request, execute the corresponding task based on the second request. For a specific implementation, refer to step 407 in FIG. 4 in which the data storage device receives the second permission information and executes the task corresponding to the second request and step 806 in FIG. 8 in which the data storage device receives the second permission information and executes the task corresponding to the second request.

A second sending module 1005 is configured to send response information to the blockchain platform, where the response information indicates that the data storage device has executed the task corresponding to the second request. For a specific implementation, refer to step 408 in FIG. 4 in which the data storage device sends the response information to the blockchain platform and step 807 in FIG. 8 in which the data storage device sends the response information to the blockchain platform.

A third sending module 1006 is configured to send confirmation information to the data request device, where the confirmation information indicates that the data storage device has executed the task corresponding to the second request. For a specific implementation, refer to step 410 in FIG. 4 in which the data storage device sends the confirmation information to the data request device and step 809 in FIG. 8 in which the data storage device sends the confirmation information to the data request device.

In this embodiment, the data storage device 1000 may perform the operations performed by the data storage device in the embodiment shown in any one of FIG. 4 to FIG. 8.

Figure 11:
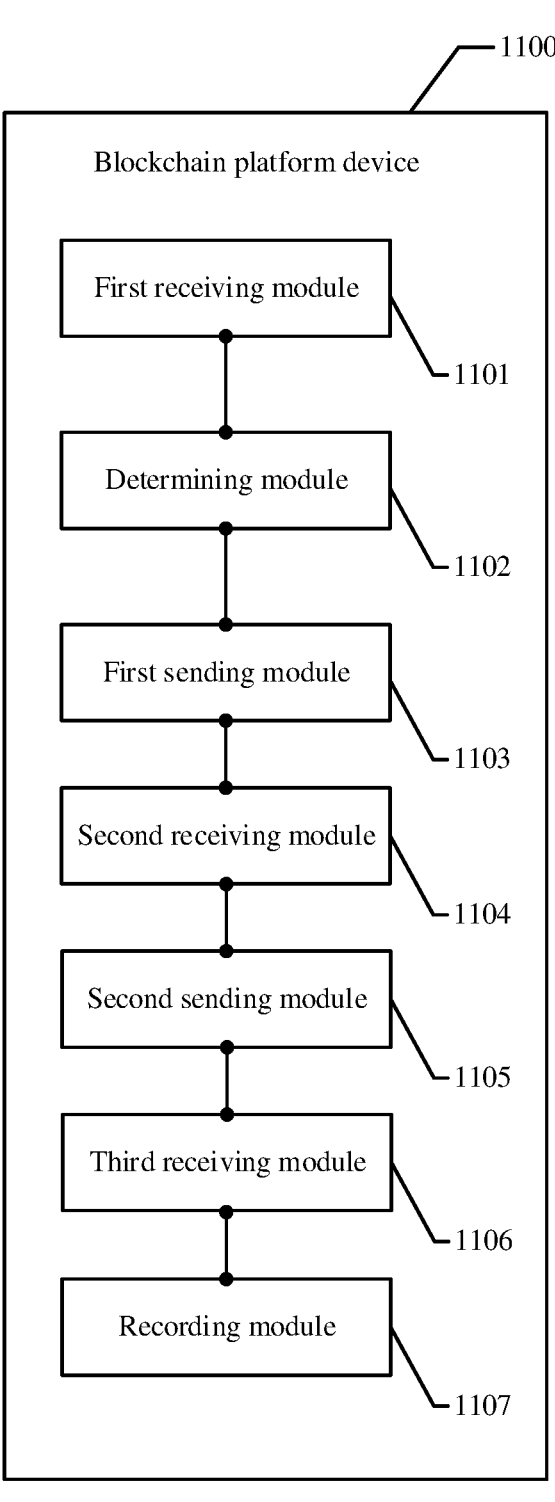
FIG. 11 is an example schematic diagram of a structure of a blockchain platform device according to an embodiment of this application.

The following describes a blockchain platform device in embodiments of this application. FIG. 11 provides a blockchain platform device 1100 according to an embodiment of this application. The blockchain platform device may be the blockchain platform device in FIG. 4 to FIG. 8. The blockchain platform device 1100 includes the following modules.

A first receiving module 1101 is configured to receive a first request sent by a data request device, where the first request indicates that the data request device needs to access a data storage device, and the first request includes signature information of the data request device and an access type. For a specific implementation, refer to step 402 in FIG. 4 in which the data request device sends the first request to the blockchain platform and step 801 in FIG. 8 in which the data request device sends the first request to the blockchain platform.

A determining module 1102 is configured to determine, based on the signature information of the data request device and the access type, whether the data request device is capable of accessing the data storage device. For a specific implementation, refer to step 403 in FIG. 4 in which the blockchain platform sends the first permission information to the data request device and step 802 in FIG. 8 in which the blockchain platform sends the first permission information to the data request device.

A first sending module 1103 is configured to send first permission information to the data request device, where the first permission information indicates whether the data request device is capable of accessing the data storage device. For a specific implementation, refer to step 403 in FIG. 4 in which the blockchain platform sends the first permission information to the data request device and step 802 in FIG. 8 in which the blockchain platform sends the first permission information to the data request device.

A second receiving module 1104 is configured to receive an access verification request sent by the data storage device, where the access verification request indicates that the data request device sends a second request to the data storage device. For a specific implementation, refer to step 405 in FIG. 4 in which the data storage device sends the access verification request to the blockchain platform and step 804 in FIG. 8 in which the data storage device sends the access verification request to the blockchain platform.

A second sending module 1105 is configured to: if the blockchain platform device determines that the data request device is capable of accessing the data storage device, send second permission information to the data storage device, where the second permission information indicates that the data storage device is capable of executing a task corresponding to the second request. For a specific implementation, refer to step 406 in FIG. 4 in which the blockchain platform sends the second permission information to the data storage device and step 805 in FIG. 8 in which the blockchain platform sends the second permission information to the data storage device.

A third receiving module 1106 is configured to receive response information sent by the data storage device, where the response information indicates that the data storage device has executed the task corresponding to the second request. For a specific implementation, refer to step 408 in FIG. 4 in which the data storage device sends the response information to the blockchain platform and step 807 in FIG. 8 in which the data storage device sends the response information to the blockchain platform.

A recording module 1107 configured to record, in a distributed ledger based on the response message, the task that corresponds to the second request and that has been executed by the data storage device. For a specific implementation, refer to step 409 in FIG. 4 in which the blockchain platform receives the response information and records the response information in the distributed ledger and step 808 in FIG. 8 in which the blockchain platform receives the response information and records the response information in the distributed ledger.

In this embodiment, the blockchain platform device 1100 may perform the operations performed by the blockchain platform device in the embodiment shown in any one of FIG. 4 to FIG. 8.

Figure 12:
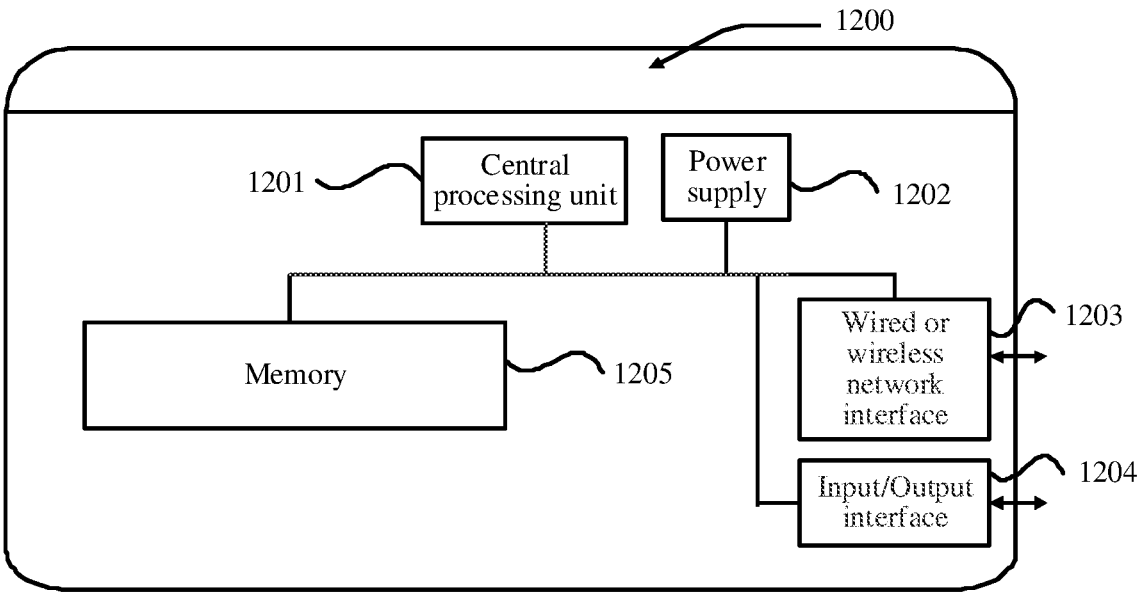
FIG. 12 is another example schematic diagram of a structure of a data request device according to an embodiment of this application.

FIG. 12 is a schematic diagram of a structure of a data request device according to an embodiment of this application. The data request device 1200 may include one or more processors 1201 and a memory 1205. The memory 1205 stores one or more application programs or data. In some implementation solutions, the memory 1205 may be further integrated with the processor 1201. In some other implementation solutions, the memory is located outside a chip, and is connected to the processor 1201 through a circuit or an interface. The processor 1201 may be a central processing unit (CPU) (similarly, a CPU may also be used as a processor in another device below).

The memory 1205 may be a volatile memory or a persistent memory. The program stored in the memory 1205 may include one or more modules, and each module may include a series of instruction operations on the data request device. Further, the processor 1201 may be configured to communicate with the memory 1205, and perform, on the data request device 1200, the series of instruction operations in the memory 1205.

The processor 1201 is configured to execute the computer program in the memory 1205, so that the data request device 1200 is configured to send, by the data request device, a first request to a blockchain platform, where the first request indicates that the data request device needs to access a data storage device, and the first request includes signature information of the data request device and an access type; receive, by the data request device, first permission information sent by the blockchain platform, where the first permission indicates whether the data request device has permission to access the data storage device, and the permission is related to the signature information of the data request device and the access type; and if the first permission information indicates that the data request device has the permission to access the data storage device, send, by the data request device, a second request to the data storage device, where the second request includes an access address. For a specific implementation, refer to steps 401 to 411 in the embodiment shown in FIG. 4 and steps 801 to 809 in the embodiment shown in FIG. 8.

The data request device 1200 may further include one or more power supplies 1202, one or more wired or wireless network interfaces 1203, one or more input/output interfaces 1204, and/or one or more operating systems, such as Windows Server™, Mac OS X™, Unix™, Linux™, and FreeBSD™.

The data request device 1200 may perform the operations performed by the data request device in the embodiment shown in any one of FIG. 4 to FIG. 8.

Figure 13:
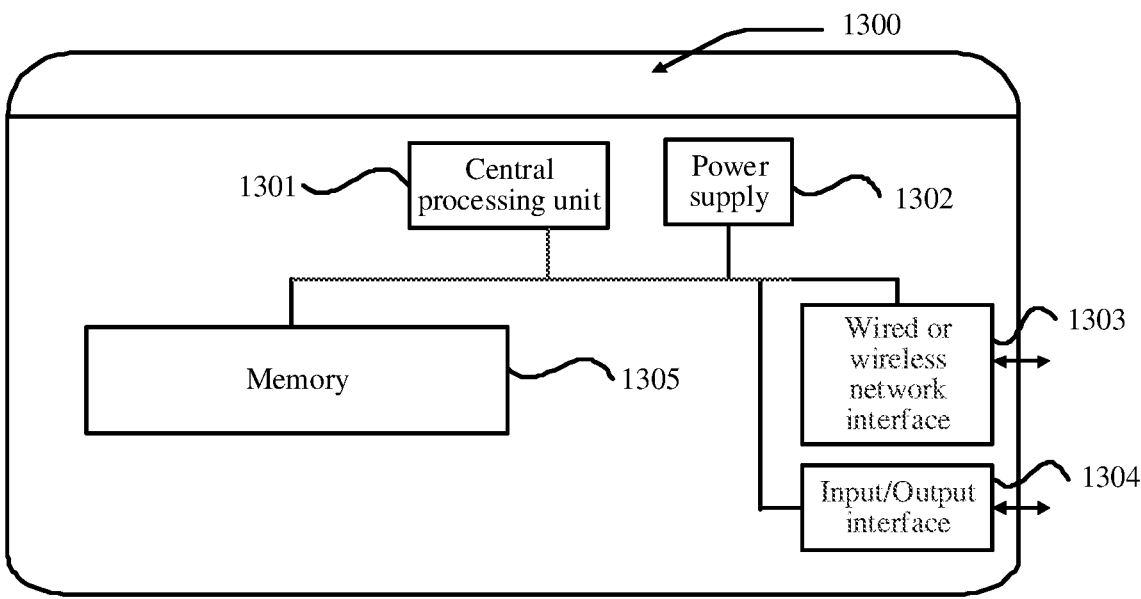
FIG. 13 is another example schematic diagram of a structure of a data storage device according to an embodiment of this application.

FIG. 13 is a schematic diagram of a structure of a data storage device according to an embodiment of this application. The data storage device 1300 may include one or more processors 1301 and a memory 1305. The memory 1305 stores one or more application programs or data.

The memory 1305 may be a volatile memory or a persistent memory. The program stored in the memory 1305 may include one or more modules, and each module may include a series of instruction operations on the data storage device. Further, the processor 1301 may be configured to communicate with the memory 1305, and perform, on the data storage device 1300, the series of instruction operations in the memory 1305.

The processor 1301 is configured to execute the computer program in the memory 1305, so that the data storage device 1300 is configured to receive, by the data storage device, a second request of a data request device, where the second request includes an access address; send, by the data storage device, an access verification request to a blockchain platform, where the access verification request indicates that the data request device sends the second request to the data storage device; receive, by the data storage device, second permission information sent by the blockchain platform, where the second permission information indicates whether the data storage device is capable of executing a task corresponding to the second request; and if the second permission information indicates that the data storage device is capable of executing the task corresponding to the second request, execute, by the data storage device, the corresponding task based on the second request. For a specific implementation, refer to steps 401 to 411 in the embodiment shown in FIG. 4 and steps 801 to 809 in the embodiment shown in FIG. 8.

The data storage device 1300 may further include one or more power supplies 1302, one or more wired or wireless network interfaces 1303, one or more input/output interfaces 1304, and/or one or more operating systems, such as Windows Server™, Mac OS X™, Unix™, Linux™, and FreeBSD™.

The data storage device 1300 may perform the operations performed by the data storage device in the embodiment shown in any one of FIG. 4 to FIG. 8.

Figure 14:
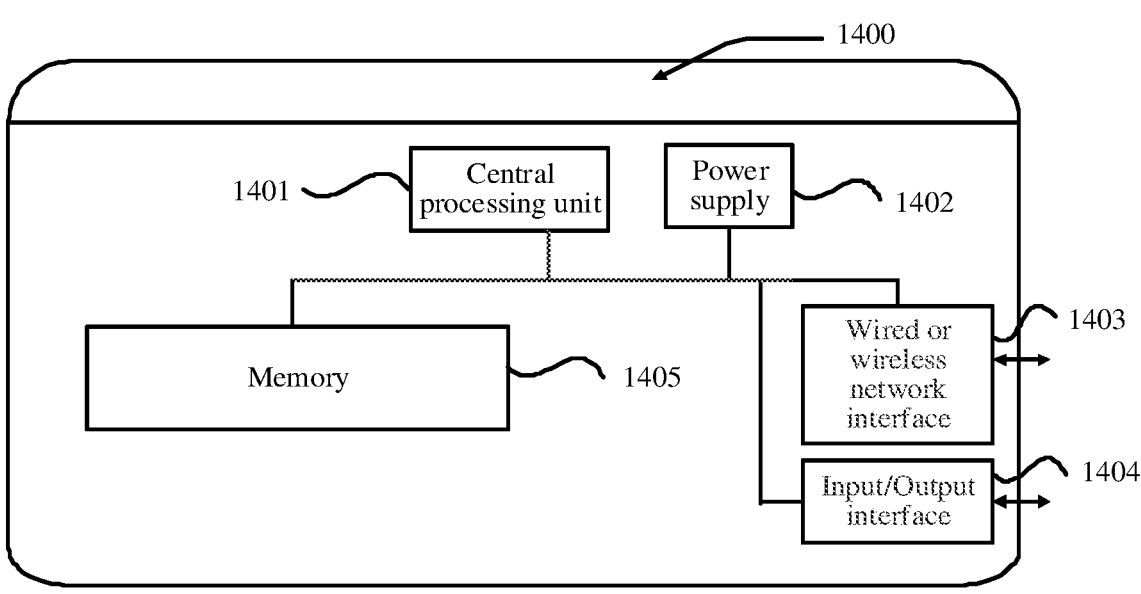
FIG. 14 is another example schematic diagram of a structure of a blockchain platform device according to an embodiment of this application.

FIG. 14 is a schematic diagram of a structure of a blockchain platform device according to an embodiment of this application. The blockchain platform device 1400 may include one or more processors 1401 and a memory 1405. The memory 1405 stores one or more application programs or data.

The memory 1405 may be a volatile memory or a persistent memory. The program stored in the memory 1405 may include one or more modules, and each module may include a series of instruction operations on the blockchain platform device. Further, the processor 1401 may be configured to communicate with the memory 1405, and perform, on the blockchain platform device 1400, the series of instruction operations in the memory 1405.

The processor 1401 is configured to execute the computer program in the memory 1405, so that the blockchain platform device 1400 is configured to execute, by the blockchain platform, a first request sent by a data request device, where the first request indicates that the data request device needs to access a data storage device, and the first request includes signature information of the data request device and an access type; determine, by the blockchain platform based on the signature information of the data request device and the access type, whether the data request device is capable of accessing the data storage device; send, by the blockchain platform, first permission information to the data request device, where the first permission information indicates whether the data request device is capable of accessing the data storage device; receive, by the blockchain platform, an access verification request sent by the data storage device, where the access verification request indicates that the data request device sends a second request to the data storage device; and if the blockchain platform determines that the data request device is capable of accessing the data storage device, send, by the blockchain platform, second permission information to the data storage device, where the second permission information indicates that the data storage device is capable of executing a task corresponding to the second request. For a specific implementation, refer to steps 401 to 411 in the embodiment shown in FIG. 4 and steps 801 to 809 in the embodiment shown in FIG. 8.

The blockchain platform device 1400 may further include one or more power supplies 1402, one or more wired or wireless network interfaces 1403, one or more input/output interfaces 1404, and/or one or more operating systems, such as Windows Server™, Mac OS X™, Unix™, Linux™, and FreeBSD™.

The blockchain platform device 1400 may perform the operations performed by the blockchain platform device in the embodiment shown in any one of FIG. 4 to FIG. 8.

Figure 15:
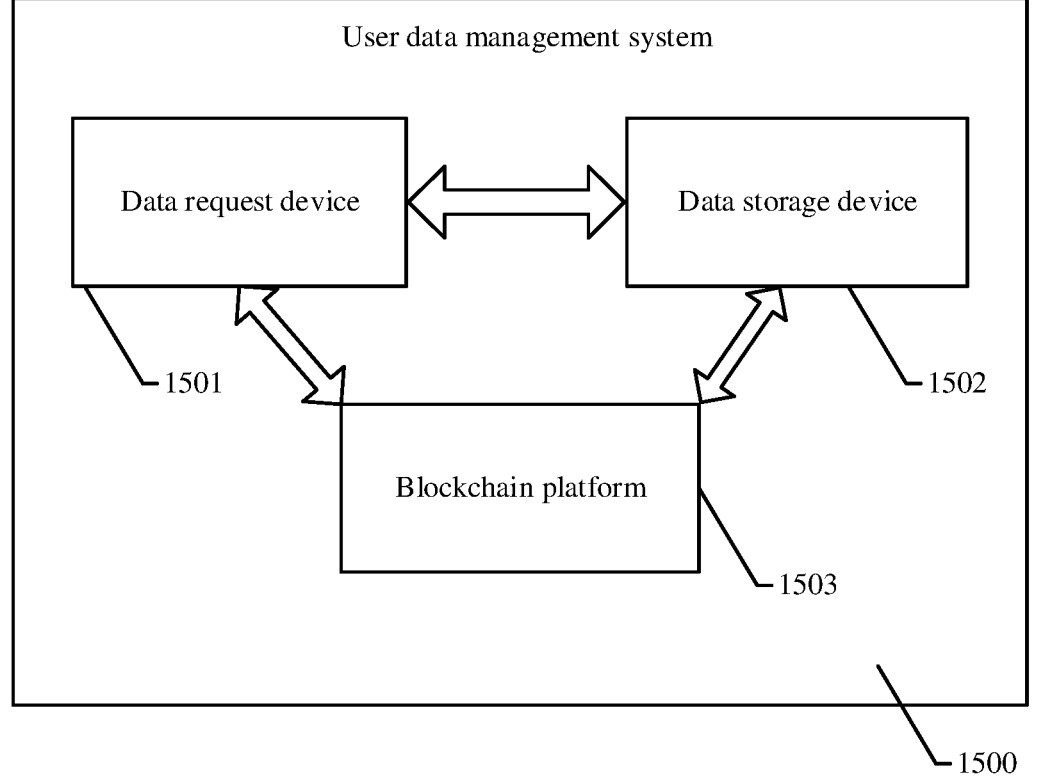
FIG. 15 is an example schematic diagram of a structure of a user data management system according to an embodiment of this application.

FIG. 15 is a schematic diagram of a structure of a user data management system 1500 according to an embodiment of this application. The user data management system 1500 may include a data request device 1501, a data storage device 1502, and a blockchain platform device 1503. The data request device 1501 may perform the operations performed by the data request device in the embodiment shown in any one of FIG. 4 to FIG. 8. The data storage device 1502 may perform the operations performed by the data storage device in the embodiment shown in any one of FIG. 4 to FIG. 8. The blockchain platform device 1503 may perform the operations performed by the blockchain platform device in the embodiment shown in any one of FIG. 4 to FIG. 8.

It may be clearly understood by a person skilled in the art that, for the purpose of convenient and brief description, for a detailed working process of the foregoing system, apparatus, and unit, refer to a corresponding process in the foregoing method embodiments.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or another form.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. A user data management method, comprising:
sending, by a data request device, a first request to a blockchain platform, wherein
the first request indicates that the data request device needs to access a data storage device, and
the first request includes signature information of the data request device and an access type;
receiving, by the data request device, first permission information sent by the blockchain platform, wherein
the first permission information indicates whether the data request device has permission to access the data storage device, and
the permission is related to the signature information of the data request device and the access type;
based on the first permission information indicating that the data request device has the permission to access the data storage device, sending, by the data request device, a second request to the data storage device, wherein the second request includes an access address; and
receiving, by the data request device, confirmation information sent by the data storage device, wherein
the confirmation information indicates that the data storage device has executed a task corresponding to the second request,
information associated with the indication that the data storage device has executed the task corresponding to the second request is broadcast to a plurality of nodes of the blockchain platform, and
the task corresponding to the second request and executed by the data storage device is recorded in a distributed ledger.

2. The method according to claim 1, wherein
the access type includes data writing and data reading; and
based on the access type including the data writing, the first request further includes the access address; or
based on the access type including the data reading, the first permission information includes the access address.

3. The method according to claim 1, wherein before sending, by the data request device, the first request to the blockchain platform, the method further comprises:
receiving, by the data request device, a third request sent by user equipment, wherein the third request indicates the data request device to send the first request to the blockchain platform.

4. The method according to claim 3, wherein the signature information of the data request device includes signature information of the user equipment.

5. The method according to claim 1, wherein the task is performed by the data storage device in association with the access address provided with the second request.

6. The method according to claim 1, wherein the access address is a data pointer.

7. The method according to claim 1, wherein the user data management method is implemented in a fifth generation (5G) communication system.

8. The method according to claim 1, wherein the task corresponding to the second request and executed by the data storage device is recorded in the distributed ledger after the plurality of the nodes reach a consensus.

9. A user data management method, comprising:

receiving, by a data storage device, a second request of a data request device, wherein the second request includes an access address;

sending, by the data storage device, an access verification request to a blockchain platform, wherein the access verification request indicates that the data request device sends the second request to the data storage device;

receiving, by the data storage device, second permission information sent by the blockchain platform, wherein the second permission information indicates whether the data storage device is configured for executing a task corresponding to the second request; and based on the second permission information indicating that the data storage device is configured for executing the task corresponding to the second request, executing, by the data storage device, the corresponding task based on the second request; and sending, by the data storage device, response information to the blockchain platform, wherein the response information indicates that the data storage device has executed the task corresponding to the second request, information associated with the response information is broadcast to a plurality of nodes of the blockchain platform, and the task corresponding to the second request and executed by the data storage device is recorded in a distributed ledger.

10. The method according to claim 9, wherein after executing, by the data storage device, the corresponding task based on the second request, the method further comprises:

sending, by the data storage device, confirmation information to the data request device, wherein the confirmation information indicates that the data storage device has executed the task corresponding to the second request.

11. The method according to claim 9, wherein the task corresponding to the second request and executed by the data storage device is recorded in the distributed ledger after the plurality of the nodes reach a consensus.

12. The method according to claim 9, wherein the task is performed by the data storage device in association with the access address provided with the second request.

13. A user data management method, comprising:

receiving, by a blockchain platform, a first request sent by a data request device, wherein the first request indicates that the data request device needs to access a data storage device, and the first request includes signature information of the data request device and an access type;

determining, by the blockchain platform based on the signature information of the data request device and the access type, whether the data request device is configured for accessing the data storage device;

sending, by the blockchain platform, first permission information to the data request device, wherein the first permission information indicates whether the data request device is configured for accessing the data storage device;

receiving, by the blockchain platform, an access verification request sent by the data storage device, wherein the access verification request indicates that the data request device sends a second request to the data storage device;

based on the blockchain platform determining that the data request device is configured for accessing the data storage device, sending, by the blockchain platform, second permission information to the data storage device, wherein the second permission information indicates that the data storage device is configured for executing a task corresponding to the second request;

receiving, by the blockchain platform, response information sent by the data storage device, wherein the response information indicates that the data storage device has executed the task corresponding to the second request;

after receiving the response information sent by the data storage device, broadcasting information associated with the response information to a plurality of nodes of the blockchain platform; and recording the task corresponding to the second request and executed by the data storage device in the distributed ledger.

14. The method according to claim 13, wherein based on the access type including data reading, the first permission information includes an access address.

15. The method according to claim 13, further wherein the task corresponding to the second request and executed by the data storage device is recorded in the distributed ledger after the plurality of the nodes reach a consensus.

16. The method according to claim 13, wherein the task is performed by the data storage device in association with the access address provided with the second request.

17. A data request device, comprising:

a processor; and a memory configured to store computer readable instructions that, when executed by the processor, cause the data request device to:

send a first request to a blockchain platform, wherein the first request indicates that the data request device needs to access a data storage device, and the first request includes signature information of the data request device and an access type;

receive first permission information sent by the blockchain platform, wherein the first permission information indicates whether the data request device has permission to access the data storage device, and the permission is related to the signature information of the data request device and the access type;

based on the first permission information indicating that the data request device has the permission to access the data storage device, send a second request to the data storage device, wherein the second request includes an access address; and receive confirmation information sent by the data storage device, wherein the confirmation information indicates that the data storage device has executed a task corresponding to the second request, information associated with the indication that the data storage device has executed the task corresponding to the second request is broadcast to a plurality of nodes of the blockchain platform, and the task corresponding to the second request and executed by the data storage device is recorded in a distributed ledger.

18. The data request device according to claim 17, wherein the access type includes data writing and data reading; and based on the access type including the data writing, the first request further includes the access address; or based on the access type including the data reading, the first permission information includes the access address.

19. The data request device according to claim 17, wherein the data request device is further caused to:

receive a third request sent by user equipment, wherein the third request indicates the data request device to send the first request to the blockchain platform.

20. The data request device according to claim 17, wherein the task corresponding to the second request and executed by the data storage device is recorded in the distributed ledger after the plurality of the nodes reach a consensus.

* * * * *